US005866532A

United States Patent [19]

Jackson et al.

[11] Patent Number: 5,866,532

[45] Date of Patent: Feb. 2, 1999

[54] AUTOMOTIVE CLEANING AND PROTECTANT COMPOSITION

[75] Inventors: Ronald C. Jackson, Wyoming; Robert D. Faber, Grand Rapids, both of Mich.

[73] Assignee: Amway Corporation, Ada, Mich.

[21] Appl. No.: 920,788

[22] Filed: Aug. 29, 1997

[51] Int. Cl.[6] .............................. C09C 1/04; C11D 3/02; C11D 3/66

[52] U.S. Cl. ......................... 510/466; 106/3; 106/207.13; 106/287.16; 510/241; 510/242; 510/243; 510/365; 510/417; 510/460

[58] Field of Search ............................ 252/241; 510/242, 510/243, 365, 417, 466; 106/3, 287.13, 287.16

[56] References Cited

U.S. PATENT DOCUMENTS

| | | | |
|---|---|---|---|
| 4,481,126 | 11/1984 | Trinh et al. | 252/174.23 |
| 4,512,677 | 4/1985 | Trinh | 401/27 |
| 4,517,025 | 5/1985 | Plante et al. | 134/38 |
| 4,693,840 | 9/1987 | Trinh et al. | 252/174.23 |
| 4,788,006 | 11/1988 | Bolich, Jr. et al. | 252/550 |
| 4,880,557 | 11/1989 | Ohara et al. | 252/174.15 |
| 5,227,200 | 7/1993 | LeGrow | 427/387 |
| 5,330,673 | 7/1994 | Bayless | 252/171 |
| 5,429,771 | 7/1995 | Fleuren et al. | 252/358 |
| 5,507,969 | 4/1996 | Shinohara et al. | 252/174.15 |
| 5,518,533 | 5/1996 | Howe | 106/3 |
| 5,554,313 | 9/1996 | Chandler | 510/121 |
| 5,660,461 | 8/1997 | Itowe | 134/26 |
| 5,681,377 | 10/1997 | Lohr et al. | 106/3 |
| 5,700,312 | 12/1997 | Fausnight et al. | 106/10 |
| 5,753,607 | 5/1998 | Burke et al. | 510/242 |

*Primary Examiner*—Kery Fries
*Attorney, Agent, or Firm*—Brinks Hofer Gilson & Lione; G. Peter Nichols

[57] ABSTRACT

A cleaning and protectant composition for automotive painted surfaces is provided. The composition includes a low-foaming nonionic surfactant, a silicone antifoam emulsion, and a volatile silicone fluid. A method of cleaning and protecting an automotive surface includes applying the composition to the surface.

7 Claims, No Drawings

AUTOMOTIVE CLEANING AND PROTECTANT COMPOSITION

BACKGROUND OF THE INVENTION

The present invention relates to an automotive cleaning and protectant composition.

Although most people wish to keep their automobiles clean and shiny, they do not want to spend an inordinate amount of time washing and waxing or polishing their automobiles.

Many cleaning products suitable for use in washing an automobile are known, as are products suitable for waxing or polishing. A major disadvantage of such products is that the automobile must be washed prior to waxing or polishing. In most cases, it is necessary to dry the automobile after washing and before applying the wax or polish. Thus, the entire process of washing, drying, applying the wax or polish, and buffing the wax or polish consumes much time. Thus, there is a need for a product that can simultaneous accomplish washing and waxing objectives.

One solution proposed in U.S. Pat. No. 5,518,533 is to provide a protective composition which is added to wash water that comprises detergent and water. The protective composition is dispersed in the wash water. The dispersed protective composition is applied to the automotive surface, which preferably is wetted prior to application. After application, the detergent is rinsed off and the surface can then be dried using a clean, dry cloth. Unfortunately, the disclosed protective composition requires a substantial amount of agitation to disperse it into the wash water and, even then, after a period of time, the protective composition separates and floats on the surface of the wash water.

Another disadvantage to the proposed solution is that it requires the user to mix the wash water and then continually agitate the wash water to ensure that the protective composition is thoroughly dispersed.

SUMMARY OF THE INVENTION

The present invention provides a cleaning and protective composition that simply can be mixed with water and does not require continual agitation. The composition can then be applied to materials such as exterior automobile surfaces. The composition comprises a low-foaming nonionic surfactant, a silicone antifoam emulsion, and a volatile silicone fluid. Preferably, additional surfactants to aid in cleaning the surface and non-volatile silicone fluids to aid in protecting the surface are incorporated.

Another aspect of the invention includes a method of protecting a painted surface that comprises washing the surface with the composition of the present invention.

As used in the specification and claims the term "automotive" is meant to be interpreted broadly and includes an automobile body, trim, wheels, wheelcovers and tires, as well as other vehicles such as motorcycles and trucks, or stationary articles with a shiny painted surface. The surface to be treated may be clean, dirty, new or moderately oxidized and may be cool or hot.

It is noted that, unless otherwise stated, all percentages given in this specification and appended claims refer to percentages by weight of the total composition.

It is further noted that, unless otherwise stated, all viscosities refer to the viscosity as measured according to ASTM D445 at 25° C.

DETAILED DESCRIPTION OF THE INVENTION

In accordance with the present invention, the surface cleaning and protectant composition comprises three core ingredients: a low-foaming nonionic surfactant, a silicone antifoam emulsion, and a volatile silicone fluid. Preferably, the composition also includes one or more silicone fluids suitable for imparting a protective film which exhibits high gloss, enhanced color, water beading and durability. This composition also preferably includes one or more detergent surfactants to aid in cleaning a soiled surface.

In another aspect of the invention, a method of cleaning and protecting a surface comprises washing the surface with the cleaning and protectant composition of the present invention.

As noted above, there are three core ingredients that provide the unusual and unexpected properties of the present invention: a low-foaming nonionic surfactant, a silicone antifoam emulsion, and a volatile silicone fluid.

The first critical ingredient, a low-foaming nonionic surfactant, is a material that provides wetting, sheeting, and depositing of the protective film over the treated surface. Generally, the alkoxylated fatty acids, alcohols, and alkyl phenols are found to be useful. Preferably, the low-foaming nonionic surfactant is an alkoxylated alcohol. Alkoxylated alcohols are known to those of skill in the art and include those listed and described in McCutcheon's Emulsifiers and Detergents, the relevant portions thereof being incorporated herein by reference.

More preferably, the low-foaming nonionic surfactant is selected from the group consisting of ethoxylated or propoxylated fatty acids, alcohols, and alkyl phenols, as well as the mixed ethoxylated/propoxylated fatty acids, alcohols, and alkyl phenols, with the mixed propoxylated and ethoxylated alcohols being preferred. A particularly preferred mixed propoxylated and ethoxylated alcohol is sold by Union Carbide Chemical & Plastics Co. under the trade name Tergitol® Min-Foam 1X, which is believed to be a mixed ethylene oxide and propylene oxide condensate of a secondary alcohol.

The low-foaming nonionic surfactant is present in an amount from about 0.1% to about 30%, preferably from about 0.5% to about 20%. More preferably, the low-foaming nonionic surfactant is present in an amount from about 1% to about 10%, most preferably from about 2% to about 5%.

The second core ingredient, a silicone antifoam emulsion, is an organosiloxane emulsion such as a polydimethylsiloxane emulsion designed to suppress foaming in aqueous systems. Silicone based antifoam emulsions are known to those of skill in the art and include those listed and described in McCutcheon's Functional Materials, the relevant portion thereof being incorporated herein by reference. A particularly preferred silicone antifoam emulsion is sold by OSi Specialties, Inc. under the trade name Sag® 10, a proprietary 10% active silicone antifoam agent emulsified in water.

The silicone antifoam emulsion is present in an amount from about 0.2% to about 30%, preferably from about 0.5% to about 20%. More preferably, the silicone defoamer emulsion is present in an amount from about 1% to about 10%, most preferably from about 1% to about 6%.

The third core ingredient, a volatile silicone fluid, is believed to promote leveling of the residual silicone polish film, thus deepening the color of painted surfaces, and to aid in controlling the viscosity of the composition. Volatile silicone fluids generally are low viscosity silicone fluids with an appreciable vapor pressure at ambient temperatures. Generally, the volatile silicone fluids useful in the present invention have a viscosity of less than about 10 cSt. at 25° C., preferably less than about 5 cSt. at 25C. Preferred volatile silicone fluids include the polydimethylcyclosiloxanes.

Polydimethylcyclosiloxane fluids useful in the present invention can be defined by the general formula $[(CH_3)_2SiO]_x$ where x has a value from three to eight. Generally, the polydimethylcyclosiloxane fluid useful in the present invention is a mixture of one or more of the various species represented by the above formula. The commercial polydimethylcyclosiloxanes are mixtures of the various species represented by the above formula and are considered within the scope of the present invention.

The preferred polydimethylcyclosiloxane fluids for use in this invention are those where octamethylcyclotetrasiloxane, decamethylcyclopentasiloxane, and dodecamethylcyclohexasiloxane (i.e. where x is from 4 to 6) predominate. The fluids where decamethylcyclopentasiloxane and dodecamethylcyclohexasiloxane predominate are particularly preferred. In accordance with the most preferred embodiment, those volatile silicone fluids manufactured by Dow Corning® Corporation are used. It is believed that Dow Corning® 245 and 345 volatile silicone fluids primarily consist of decamethylcyclopentasiloxane with lesser amounts of dodecamethylcyclohexasiloxane and minor amounts of octamethylcyclotetrasiloxane.

The amount of volatile silicone fluids to be incorporated into the composition range from about 0.1% to about 35%, preferably from about 1% to about 30%. More preferably, the volatile silicone fluids are incorporated in an amount from about 5% to about 25% and in a particularly preferred embodiment, the volatile silicone fluids are incorporated in an amount from about 10% to about 20%.

In addition to the volatile silicone fluid, it is desirable to incorporate nonvolatile silicone fluids to provide a protective film on the surface that exhibits high gloss, improved color brilliance and water beading. The nonvolatile silicone fluids include one or more organopolysiloxanes. In particular, medium viscosity (i.e., greater than about 350 cSt.) organopolysiloxanes can be included to provide gloss characteristics to the composition. In addition, low viscosity (i.e., about 50 to about 350 cSt.) organopolysiloxanes can be included to provide some leveling and drag reducing attributes to the composition. Accordingly, the present composition preferably includes one or more organopolysiloxane fluids to provide these attributes.

The low to medium viscosity organopolysiloxane fluids useful in the present invention may be either linear or branched chained siloxanes having a viscosity from about 5 to about 100,000 cSt. at 25° C. In particular, those organopolysiloxanes with a viscosity from about 50 to about 10,000 cSt. at 25° C. are preferred. Of course, it is possible to blend organopolysiloxane fluids having different viscosities to form a fluid having the desired viscosity range. Alternatively, it is possible to use one or more organopolysiloxane fluids, each having a different viscosity, in the protective film composition to produce the desired end-product characteristics.

Organopolysiloxanes useful in the present composition are those compounds having the general formula:

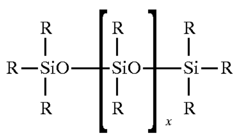

wherein the R's may be the same of different and can be alkyl radicals, e.g. methyl, ethyl, propyl, butyl, octyl, dodecyl, and octadecyl; aryl radicals, e.g. phenyl, diphenyl, and naphthyl; alkenyl radicals, e.g. vinyl, acryl, and alkylvinyl; cycloalkyl radicals, e.g. cyclobutyl, cyclopentyl, and cyclohexyl; alkaryl radicals, e.g. tolyl, xylyl, and ethylphenyl; and x has a numerical value preferably from about 40 to about 800, providing a viscosity of 50 to 10,000 cSt.

Those polysiloxanes where R is selected from the group consisting of aryl, those alkyl radicals having up to about 30 carbon atoms, and mixtures thereof are preferred, especially those where the polysiloxane is tri-methyl end capped. The polysiloxanes where R is selected from the group consisting of phenyl, those alkyl radicals having up to about 15 carbon atoms, and mixtures thereof are more preferred, especially those where the polysiloxane is tri-methyl end capped. More particularly, a combination of one or more low viscosity (i.e., about 50 to about 350 cSt.) and medium viscosity (i.e., about 350 to about 10,000 cSt.) tri-methyl end capped polydimethylsiloxanes are preferred.

The amount and type of organopolysiloxane fluid useful in the present invention will depend upon the desired characteristics sought for the protectant composition and the compatibility with the other ingredients of the composition. The amount of organopolysiloxane included in the present invention, however, must not be so great that the other desired attributes such as easy buff-out and good film clarity are detrimentally affected.

Accordingly, when the organopolysiloxane fluid is included it can be included in the cleaning and protectant composition in amounts from about 1% to about 70%, preferably from about 10% to about 60%. More preferably, the nonvolatile silicone fluids are incorporated in an amount from about 20% to about 50% and in a particularly preferred embodiment, the nonvolatile silicone fluids are incorporated in an amount from about 30% to about 45%. Preferably, the organopolysiloxanes are included in an amount such that the ratio of low viscosity (less than about 350 cSt.) organopolysiloxanes to medium viscosity (greater than about 350 cSt.) organopolysiloxanes ranges from about 1:3 to about 3:1 with a ratio of about 2:1 being preferred.

It is known that amino-functional silicones can aid in anchoring a silicone film to many types of surfaces, thus providing a more durable finish. Therefore, the present composition contemplates the incorporation of a minor amount of an amino-functional polysiloxane, preferably a non-hydrolyzable amino-functional polysiloxane, which aids in providing a more substantive protective film and improved water beading performance of the composition. In addition, amino-functional silicone fluids are thought to be useful in protectant compositions because it is believed specifically that they attach to the anionic surfaces of, for example, an automobile. Accordingly, the type and amount of amino-functional silicone fluid useful in the present invention can be dictated by, among other things, the desired resulting properties of the protectant composition as well as its compatibility with the other ingredients.

Preferably, the amino-functional silicone fluids include, but are not limited to, those polysiloxanes with the general formula:

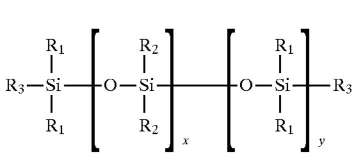

wherein x+y ranges from 2 to 20, preferably wherein x ranges from 2 to about 20 and y is 1. $R_1$ is an oxy radical, e. g. hydroxy, methoxy, ethoxy, phenoxy, alkenoxy, and the like; an alkyl radical, e.g. methyl, ethyl, propyl, butyl, and the like; an aryl radical, e.g. phenyl, diphenyl, naphthyl, and the like or combinations thereof. Preferably, $R_1$ is selected from the group consisting of hydroxy, alkoxy, alkenoxy, phenoxy, methyl, ethyl, propyl, etc., and mixtures thereof. More preferably, $R_1$ is selected from the group consisting of alkyl radicals having up to about 8 carbon atoms and mixtures thereof. In accordance with the most preferred embodiment, $R_1$ is selected from the group consisting of methyl, ethyl, and mixtures thereof.

$R_2$ may be an alkyl radical, e.g. methyl, ethyl, propyl, butyl, octyl, dodecyl, and octadecyl; aryl radical, e.g. phenyl, diphenyl, and naphthyl; alkenyl radical, e.g. vinyl, acryl, and alkylvinyl radical; cycloalkyl radical, e.g. cyclobutyl, cyclopentyl, and cyclohexyl; alkaryl radical, e.g. tolyl, xylyl, ethylphenyl, and the like. Preferably, $R_2$ is selected from the group consisting of alkyl, aryl, and mixtures thereof. More preferably $R_2$ is selected from the group consisting of alkyl having up to about 18 carbon atoms, phenyl, and mixtures thereof. Particularly preferred is where $R_2$ is selected from the group consisting of methyl, ethyl, phenyl, and mixtures thereof.

$R_3$ is an amine radical, e.g. primary, secondary, and tertiary amines as well as diamines. Preferably, $R_3$ is selected from the group consisting of alkylamines, alkyldiamines and mixtures thereof. More preferably, $R_3$ is selected from the group consisting of alkylamines having up to about 8 carbon atoms, alkyldiamines having up to about 16 carbon atoms, and mixtures thereof. In accordance with the most preferred embodiment, an amino-functional silicone manufactured by PPG Mazer Chemicals under the trade name Masil® 124 is used. This product is a proprietary amino-functional silicone fluid containing aminoalkyl functionality with no alkoxy functionality.

The amount of amino-functional polysiloxane incorporated in the composition can vary. Generally speaking, however, at least about 0.1 percent is usually necessary to obtain reasonable film anchoring and enhanced durability. It is preferred to use up to about 10 percent with from about 0.1 to about 5 percent being more preferred. In accordance with the most preferred embodiment, about 0.5 to about 3 percent of the amino-functional silicone fluid is incorporated in the cleaning and protectant composition.

The composition may also include additional ingredients to provide advantageous cleaning or protecting properties. For example, the composition may also include detergent surfactants to aid in the detergency and cleaning of the surfaces. In a preferred embodiment, one or more surfactants are incorporated into the composition of the present invention. The surfactants are selected from the group consisting of anionic surfactants, nonionic surfactants, and mixtures thereof.

The anionic surfactants useful in the present invention include the sulfates and particularly the ether sulfates. Those of skill in the art will understand that the sulfates include those listed and described in McCutcheon's Emulsifiers and Detergents, the relevant portions thereof being incorporated herein by reference. In particular, the sulfates of ethoxylated alcohols, and their salts are preferred, for example, the sodium salt of an alkyl ether sulfate. In this, regard it is preferred to use the sodium or ammonium salt of a $C_6$–$C_{18}$alkyl ether sulfate having an average of about 2 to about 10 moles of ethylene oxide. More preferably, the salt of a $C_8$–$C_{14}$ alkyl ether sulfate having an average of about 2 to about 5 moles of ethylene oxide may be used. A particularly preferred alkyl ether sulfate is sodium or ammonium lauryl ether sulfate having an average of about 3 moles of ethylene oxide.

Other anionic surfactants that may find use in the particular invention include the sulfates and sulfonates such as linear alkane sulfonate, alkyl alkoxylate sulfate, alkyl glyceryl sulfonate, alkyl sulfate, and alpha olefin sulfonates, as well as salts of soap, alkyl linear alkylbenzenesulfonates, primary or secondary alkanesulfonates, sulfonated polycarboxylic acids, alkylpolyglycolethersulfates, alkyl glycerol sulfonates, fatty acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters and diesters of succinates, acyl sarcosinates, sulfates of alkylpolysaccharides such as the sulfates of alkylpolyglucoside, branched primary slkyl sulfates, and alkyl polyethoxy carboxylates. Further examples are described in "Surface Active Agents and Detergents" (Vol I and II by Schwartz, Perry and Berch) and McCutcheon's Emulsifiers and Detergents, both of which are incorporated herein in their entirety by reference.

The anionic surfactants can be incorporated into the composition of the present invention in an amount from about 0.1% to about 20%, preferably from about 0.5% to about 15%. More preferably, the anionic surfactants are incorporated in an amount from about 1% to about 10% and in a particularly preferred embodiment, the anionic surfactants are incorporated in an amount from about 1% to about 5%.

Other anionic surfactants that may be beneficial in the composition of the present invention include the fluoro surfactants such as the fluoroalkyl sulfonates and their salts. It is believed that these surfactants aid in wetting various surfaces. In particular, the ammonium perfluoroalkyl sulfonates are preferred. When included, the fluoro surfactants are used in minor amounts, typically less than about 5%. For example, they may be incorporated in an amount from about 0.01% to about 5%, preferably from about 0.05% to abut 2.5%, and more preferably from about 0.1% to about 1%.

The nonionic surfactants useful in the composition of the present invention include the ethoxylated alcohols. Other nonionic surfactants may also be useful in the present invention and may include the polyethylene oxide condensates of alkyl phenols, the condensation products of ethylene oxide with a hydrophobic base formed by the condensation of propylene oxide with propylene glycol, the condensation products of ethylene oxide with a product resulting from the reaction of propylene oxide and ethylene diamine, alkyl polysaccharides, polyether surfactants, amides, and amine oxides Other suitable examples may be found in "Surface Active Agents and Detergents" (Vol I and II by Schwartz, Perry and Berch) and McCutcheon's Emulsifiers and Detergents, both of which are incorporated herein in their entirety by reference.

In particular, the linear alcohol ethoxylates are preferred with the alkyl portion having from about 8 to about 15 carbon atoms, more preferably from about 10 to about 12 carbon atoms. In general, the alcohols are ethoxylated with from about 3 to about 11 moles of ethylene oxide, preferably from about 5 to about 9 moles and more preferably with about 7 moles of ethylene oxide. A particularly preferred alcohol ethoxylate is a $C_{11}$ linear primary alcohol ethoxylate containing an average of 7 moles of ethylene oxide per mole of alcohol. When used, the nonionic surfactants may be incorporated in an amount from about 0.1% to about 20%

Desirably, when ethoxylated alcohols are used they are incorporated in an amount from about 0.1% to about 20%, preferably from about 0.5% to about 15%. More preferably, the ethoxylated alcohol is incorporated in an amount from about 1% to about 10% and in a particularly preferred embodiment, the ethoxylated alcohol is incorporated in an amount from about 1% to about 5%.

Fatty acid amides may also find use in the compositions of the present invention. For example, the fatty acid alkanolamides such as cocamide DEA, which is a mixture of ethanolamides of coconut acid are particularly preferred. When used, they may be incorporated in an amount from about 0.1% to about 20%, preferably from about 0.5% to about 15%. More preferably, the fatty acid alkanolamides are incorporated in an amount from about 1% to about 10% and in a particularly preferred embodiment, the fatty acid alkanolamides are incorporated in an amount from about 1% to about 5%.

The composition may also include thickeners and fillers to aid in suspending the silicone fluids and as a colorant aid. For example, fillers that may be useful in the present invention include $TiO_2$, $Al_2O_3$, $CaCO_3$, aluminosilicates and $SiO_2$. The preferred filler is titanium dioxide and is used in an amount from about 0.01% to about 1%, preferably from about 0.05% to about 0.5% and more preferably from about 0.1to about 0.2%.

Suitable thickeners may include gums and the like, such as guar and xanthan gum. Other known thickeners may also be incorporated into the composition so long as they do not detract from the advantageous properties resulting from the composition of the present invention. For example, homo- and co-polymers of acrylic acid, and polymeric celluloses may be used. The thickener is included in an amount effective to maintain dispersion of the silicone fluids within the composition. In this regard, the thickener is generally incorporated in an amount less than about 5% and more typically in an amount from about 0.01% to about 5%, preferably from about 0.05% to about 2%, more preferably from about 0.1% to about 1%.

Other optional ingredients may also be incorporated into the composition of the present invention so long as they do not detract from the advantages achieved by the present invention. Generally, the optional ingredients are added in minor amounts not to exceed a cumulative amount of about 5% and typically are added in individual amounts less than about 1%. The optional ingredients may include, among other ingredients, hand dishwashing detergents, soaps, fragrance and colorants.

Although the composition need not contain water, it is desirable to include water to form an aqueous composition. By including water, it can be ensured that the appropriate dispersion of the cleaning and protectant composition is maintained, even when further diluted with water before use: Thus, in the preferred composition of the present invention, water comprises the balance and is therefore present in an amount from about 10% to about 90%, preferably from about 20% to about 60%, more preferably from about 25% to about 45%, and desirably from about 30% to about 40%.

Once the above composition is formulated it may be used as follows. The composition is added to water in, for example, a bucket. Alternatively, the composition may be added to the bucket with the water being subsequently added. Generally, the composition is an amount from about 1 ml to about 100 ml per liter of water, preferably in an amount from about 2 ml to about 50 ml per liter of water, with an amount from about 4 ml to about 20 ml per liter of water being more preferred.

Once the composition is dispersed in the water, the surface is simultaneously cleaned and protected using a cloth or sponge to apply the dispersed composition. The protective silicones will deposit on the surface during washing and impart a uniform protective film.

When applied in this manner, the composition protects and beautifies the surfaces, for example, the painted surfaces of a car, without smearing or streaking. It provides a high gloss on the surface, and enhances the color brilliance of the surface. It also provides a semi-durable, water beading surface. Durability is measured by the water beading capabilities as well as the gloss of the treated surface over time.

Surprisingly, it has been found when the three core ingredients are combined and added to, for example, a bucket of water, the silicones present in the composition do not separate or dissociate from the composition but instead are released onto the surface to form a protective coating on the surface. Advantageously, the composition imparts a desirable gloss on the surface without the need for a separate wax application.

Alternative methods of applying the diluted composition of the present invention include but are not limited to wiping directly onto the surface, spraying either by a hand pump or aerosol, or other suitable methods of applying a liquid onto a surface.

The following are illustrative examples of formulations and compositions according to this invention:

EXAMPLE 1

Compositions A–J were prepared as shown in Table 1. Table 2 presents the results of the evaluation by a trained person. Each composition was evaluated for dilution and concentrate stability. For dilution stability, about 1 ounce of each composition was added to about 1 gallon of water to provide about 0.78% solution. For film thickness and gloss, about 1 ounce of each composition was added to about 1 gallon of water to provide about 0.78% solution which was applied to a section of a painted panel and compared to a control section, to which no composition was applied. This evaluation demonstrates the beneficial properties resulting from compositions according to the present invention.

TABLE 1

| Components: | A | B | C | D | E | F | G | H | I | J |
|---|---|---|---|---|---|---|---|---|---|---|
| Water | 31.55 | 34.10 | 36.10 | 38.10 | 32.10 | 32.10 | 32.10 | 32.10 | 32.10 | 32.10 |
| Titanium Dioxide | 0.15 | | | | | | | | | |
| Xanthan Gum | 0.40 | 0.40 | 0.40 | 0.40 | 0.40 | 0.40 | 0.40 | 0.40 | 0.40 | 0.40 |
| Cocamide DEA | 2.00 | | | | 2.00 | 2.00 | 2.00 | 2.00 | 2.00 | 2.00 |
| Neodol 1-7 | 2.00 | 2.00 | | | | | | 2.00 | 2.00 | 2.00 |
| SLES | 2.00 | 2.00 | 2.00 | | 2.00 | 2.00 | | 2.00 | 2.00 | 2.00 |
| Tergitol Min-Foam 1X | 3.00 | 3.00 | 3.00 | 3.00 | 3.00 | 3.00 | 3.00 | 3.00 | 3.00 | 3.00 |
| Novell 8-7 | | | | | 2.00 | | | | | |
| Neodol 25-7 | | | | | | 2.00 | | | | |
| Amine Oxide | | | | | | | 2.00 | | | |
| ALES | | | | | | | 2.00 | | | |
| Volatile Silicone | 15.00 | 15.00 | 15.00 | 15.00 | 15.00 | 15.00 | 15.00 | 15.00 | 15.00 | 15.00 |

TABLE 1-continued

| Components: | A | B | C | D | E | F | G | H | I | J |
|---|---|---|---|---|---|---|---|---|---|---|
| 10,000 cSt. Silicone Fluid | 12.00 | 12.00 | 12.00 | 12.00 | 12.00 | 12.00 | 12.00 | | 6.00 | 6.00 |
| 350 cSt. Silicone Fluid | 22.00 | 22.00 | 22.00 | 22.00 | 22.00 | 22.00 | 22.00 | 37.00 | 31.00 | 29.50 |
| 50 cSt. Silicone Fluid | 3.00 | 3.00 | 3.00 | 3.00 | 3.00 | 3.00 | 3.00 | | | 1.50 |
| Masil 124 Amino Functional Silicone | 1.00 | 1.00 | 1.00 | 1.00 | 1.00 | 1.00 | 1.00 | 1.00 | 1.00 | 1.00 |
| Silicone Antifoam Emulsion | 5.00 | 5.00 | 5.00 | 5.00 | 5.00 | 5.00 | 5.00 | 5.00 | 5.00 | 5.00 |
| Fluoro Surfactant | 0.40 | | | | | | | | | |
| Fragrance | 0.50 | 0.50 | 0.50 | 0.50 | 0.50 | 0.50 | 0.50 | 0.50 | 0.50 | 0.50 |
| Totals: | 100.00 | 100.00 | 100.00 | 100.00 | 100.00 | 100.00 | 100.00 | 100.00 | 100.00 | 100.00 |

TABLE 2

| Evaluation: | A | B | C | D | E | F | G | H | I | J |
|---|---|---|---|---|---|---|---|---|---|---|
| dilution stability | 4 | 1 | 0 | 0 | 1 | 1 | 1 | 3 | 3 | 3 |
| concentrate stability | 3 | 1 | 1 | 0 | 1 | 2 | 2 | 1 | 3 | 3 |
| film thickness | 3 | 3 | 3 | 2 | 3 | 3 | 3 | 1 | 2 | 2 |
| gloss | 3 | 3 | 2 | 1 | 3 | 3 | 2 | 3 | 3 | 3 |
| hand feel in solution | 3 | 3 | 3 | 2 | 1 | 1 | 1 | 3 | 3 | 3 |

4 excellent; 3 good; 2 average; 1 fair; 0 poor

It should be understood that a wide range of changes and modifications can be made to the compositions and methods of this invention. It is therefore intended that the foregoing description illustrates rather than limits this invention, and that it is the following claims, including all equivalents, which define this invention.

What is claimed:

1. A cleaning and protectant composition comprising:

a. from about 1% to about 10% of a low foaming nonionic surfactant selected from the group consisting of alkoxylated alcohols;

b. from about 1% to about 10% of a silicone antifoam emulsion selected from the group consisting of polydimethylsiloxane emulsions in water;

c. from about 5% to about 25% of a volatile silicone fluid selected from the group consisting of polydimethylcyclosiloxanes having a viscosity less than about 10 cSt. at 25° C.;

d. from about 20% to about 50% of nonvolatile silicone fluids selected from the group consisting of organopolysiloxanes having a viscosity from about 50 cSt. to about 10,000 cSt.; and, e. from about 1% to about 30% additional surfactants which comprise a mixture of anionic surfactant and nonionic surfactant wherein the anionic surfactant is selected from the group consisting of alcohol sulfates, alcohol ether sulfates and mixtures thereof and the nonionic surfactant is an alkanolamide.

2. The composition of claim 1 further comprising a thickener.

3. The composition of claim 2 further comprising an amino-functional silicone.

4. The composition of claim 3 further comprising water.

5. The composition of claim 1 wherein the said alkanolamide is cocoamide diethanolamine.

6. A cleaning and protectant composition comprising:

(a) from about 0.1% to about 30% of a low-foaming nonionic surfactant selected from the group consisting of alkoxylated alcohols;

(b) from about 0.2% to about 30% of a volatile silicone fluid selected from the group consisting of polydimethylsiloxane emulsions in water;

(c) from about 0.1% to about 30% of a volatile silicone fluid selected from the group consisting of polydimethylcyclosiloxanes having a viscosity less than about 10 cSt at 25° C.;

(d) from about 1% to 70% of at least one nonvolatile silicone fluid having a viscosity from about 5 cSt. to about 100,000 cSt.; and (e) from about 1% to about 30% of additional surfactant which comprises a mixture of anionic surfactant and nonionic surfactant wherein the anionic surfactant is selected from the group consisting of alcohol sulfates, alcohol ether sulfates, and mixtures thereof and wherein the nonionic surfactant is an alkanolamide.

7. A cleaning and protectant composition according to claim 6 wherein said composition further comprises a thickener.

* * * * *